US010763587B2

(12) United States Patent
Chang et al.

(10) Patent No.: US 10,763,587 B2
(45) Date of Patent: Sep. 1, 2020

(54) MICROWAVE REFLECTOR LINK, AND CDMA-SPREAD SPECTRUM REFLECTOR APPARATUS FOR REDUCTION OF UNMODULATED AMBIENT BLOCKERS IN REFLECTED DATA LINKS

(71) Applicants: THE REGENTS OF THE UNIVERSITY OF CALIFORNIA, Oakland, CA (US); CALIFORNIA INSTITUTE OF TECHNOLOGY, Pasadena, CA (US)

(72) Inventors: Mau-Chung Frank Chang, Los Angeles, CA (US); Yanghyo Kim, Los Angeles, CA (US); Adrian Tang, Pasadena, CA (US); Nacer Chahat, Pasadena, CA (US)

(73) Assignees: THE REGENTS OF THE UNIVERSITY OF CALIFORNIA, Oakland, CA (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 703 days.

(21) Appl. No.: 15/407,170

(22) Filed: Jan. 16, 2017

(65) Prior Publication Data
US 2017/0194713 A1 Jul. 6, 2017

Related U.S. Application Data

(63) Continuation of application No. PCT/US2015/041021, filed on Jul. 17, 2015.
(Continued)

(51) Int. Cl.
*H01Q 15/14* (2006.01)
*H01Q 1/27* (2006.01)
(Continued)

(52) U.S. Cl.
CPC .......... *H01Q 15/14* (2013.01); *H01Q 1/2291* (2013.01); *H01Q 1/246* (2013.01); *H01Q 1/273* (2013.01); *H01Q 3/26* (2013.01); *H04B 1/385* (2013.01)

(58) Field of Classification Search
CPC ...... H01Q 1/2291; H01Q 1/273; H01Q 1/246; H01Q 15/14; H01Q 3/26
(Continued)

(56) References Cited

U.S. PATENT DOCUMENTS 6,657,580 B1 * 12/2003 Edwards ............... G01S 13/756
342/51
7,046,957 B1 * 5/2006 Farr ..................... H04L 27/2039
342/44

(Continued)

OTHER PUBLICATIONS

Korean Intellectual Property Office (KIPO), International Search Report and Written Opinion dated Nov. 27, 2015, counterpart PCT International Application No. PCT/US2015/041021, pp. 1-19, with claims searched, pp. 20-27.
(Continued)

*Primary Examiner* — Lee Nguyen
(74) *Attorney, Agent, or Firm* — O'Banion & Ritchey LLP; John P. O'Brien

(57) ABSTRACT

A system, apparatus and method are disclosed for communicating between a short range wireless (WLAN) user device, such as a wearable, phone, or tablet, with a base station. Traditional low power communication (e.g., WLAN, WiFi, Bluetooth, cellular links, etc.) involve an inefficient amplification process of a signal from the WLAN user to the base station, whereby significant power must be expended in the WLAN user device making it unsuitable in many applications. A reflector link paradigm is disclosed in which the user device communicates by modulating the extent of
(Continued)

signal reflected back to the base station. An enhanced reflector is also disclosed which overcomes adverse effects of ambient reflections.

24 Claims, 9 Drawing Sheets

Related U.S. Application Data

(60) Provisional application No. 62/025,788, filed on Jul. 17, 2014, provisional application No. 62/066,838, filed on Oct. 21, 2014.

(51) Int. Cl.
*H04B 1/3827* (2015.01)
*H01Q 1/22* (2006.01)
*H01Q 1/24* (2006.01)
*H01Q 3/26* (2006.01)

(58) Field of Classification Search
USPC ........................................ 455/41.2
See application file for complete search history.

(56) References Cited

U.S. PATENT DOCUMENTS

| | | | |
|---|---|---|---|
| RE43,242 E * | 3/2012 | Greeff | G06K 7/0008 340/10.1 |
| 9,674,124 B1 * | 6/2017 | Fisher | H04L 51/20 |
| 2006/0123093 A1 | 6/2006 | Kawamura | |
| 2008/0225932 A1 | 9/2008 | Fukuda | |
| 2009/0243804 A1 | 10/2009 | Fukuda | |
| 2010/0151892 A1 | 6/2010 | Forster | |
| 2011/0140858 A1 | 6/2011 | Ovard | |

OTHER PUBLICATIONS

Korean Intellectual Property Office (KIPO), International Search Report and Written Opinion, dated Nov. 27, 2015, related PCT International Application No. PCT/US2015/041021, pp. 1-19, with claims searched, pp. 20-27.

* cited by examiner

MICROWAVE REFLECTOR LINK, AND CDMA-SPREAD SPECTRUM REFLECTOR APPARATUS FOR REDUCTION OF UNMODULATED AMBIENT BLOCKERS IN REFLECTED DATA LINKS

CROSS-REFERENCE TO RELATED APPLICATIONS

This application is a 35 U.S.C. § 111(a) continuation of PCT international application number PCT/US2015/041021 filed on Jul. 7, 2015, incorporated herein by reference in its entirety, which claims priority to, and the benefit of, U.S. provisional patent application Ser. No. 62/025,788 filed on Jul. 17, 2014, incorporated herein by reference in its entirety, and which also claims priority to, and the benefit of, U.S. provisional patent application Ser. No. 62/066,838 filed on Oct. 21, 2014, incorporated herein by reference in its entirety. Priority is claimed to each of the foregoing applications.

The above-referenced PCT international application was published as PCT International Publication No. WO 2016/011421 on Jan. 21, 2016, which publication is incorporated herein by reference in its entirety.

STATEMENT REGARDING FEDERALLY SPONSORED RESEARCH OR DEVELOPMENT

The invention described herein was made in the performance of work under a NASA contract NNN12AA01C, and is subject to the provisions of Public Law 96-517 (35 USC 202) in which the Contractor has elected to retain title.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technological Field

This technical disclosure pertains generally to wireless data links, and more particularly to a method of eliminating a power amplifier from the transmitter chain in a wireless data link.

2. Background Discussion

Short range (local) communication links such as WLAN and similar data links (e.g., WLAN, WiFi, Bluetooth, Cellular links, and so forth) typically require a power amplifier to be incorporated in the transmitter or integrated within what is termed the "WLAN user" (wireless local area network user), which is the device connected to a WiFi or other network, such as cellular phone, tablet, laptop or wearable device.

FIG. 1 depicts a basic block diagram of a typical WLAN uplink showing a WLAN user (e.g., tablet, phone, or wearable) having a baseband data input to an upconverter receiving a local oscillator (LO) input. The output of the mixer (upconverter) is input to a power amplifier whose output drives an antenna to generate transmission to the base station (access point). The access point receives transmissions on its antenna, which is passed through a low noise amplifier, before being downconverted, in response to receipt of a LO input, to generate a baseband data output.

WiFi and WLAN technology (IEEE 802.11 A/B/C/G/N/AC/AD) have been very successful in the mobile market (e.g., phones tablets and portable gaming). However, the high power consumption of existing WiFi transceiver technology is proving to be unsuitable for the emerging wearable device market (e.g., Google Glass, Samsung Galaxy Gear, Apple Watch, and the like). One core reason causing this high power consumption, and limiting applicability of the technology, is because the WLAN transceiver (e.g., currently implemented at either 2.4 or 5.83 GHz) requires a power amplifier device to generate power levels suitable for transmitting a WiFi signal to a base-station or router. Current state-of-the-art power amplifiers remain at about 10% efficiency in typical cases with best reported performance not exceeding about 15%. This lack of efficiency translates to consuming on the order of 1000-2500 mW to generate a typical WiFi signal of 100-250 mW. This high level of power consumption is generally not compatible with wearable products (e.g., such as Google glass) where the battery is typically meager and thus unable to support high power dissipation levels.

Accordingly, a need exists for a method, apparatus and/or system for reducing power consumption in these wireless devices. The present disclosure overcomes these shortcomings and provides additional benefits.

BRIEF SUMMARY

A reflective link is presently disclosed which eliminates the need for a power amplifier in the transmitter chain within the transceiver on the wearable device side of the data-link. Eliminating the transmitter enables implementation of a WLAN or WiFi link that consumes a factor of ten to one-hundred times (10x-10x) less power on one side of the data-link, and thus which is particularly well-suited for use on the wearable device side in which power is significantly more limited.

Additionally, a reflective link is described in this disclosure which overcomes the adverse effects of the ambient reflection using additional modulation (e.g., CDMA), thereby allowing a hundred-fold (100x) improvement in either data-rate or in transmission distance. These ambient reflections are canceled in response to fully or partially cancelling the ambient reflection through CDMA signal spreading which otherwise limits receiver performance through the process of receiver desensitization, and is an improvement over the above described reflective link.

Applications of the present technology include, but are not limited to, the wireless connectivity market comprising WLAN, WiFi, Bluetooth, and Cellular connectivity. Other possible applications exist for mm-wave standards like 802.11 AD and 802.15.3 C. Lower frequency applications may also exist for UHF and the pager band (e.g., 433 MHz). Additionally, the technology could be applicable in the upcoming 5G cellular standard, such as at possibly 15 GHz or even 30 GHz. The present disclosure, however, is not limited to use in the above examples, as it will be appreciated that short range (local) wireless communications are found in an increasing number of electronic applications.

Further aspects of the presented technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

DETAILED DESCRIPTION 1.0 Microwave Reflector Link.

1.1. System Configuration.

Figure 1:
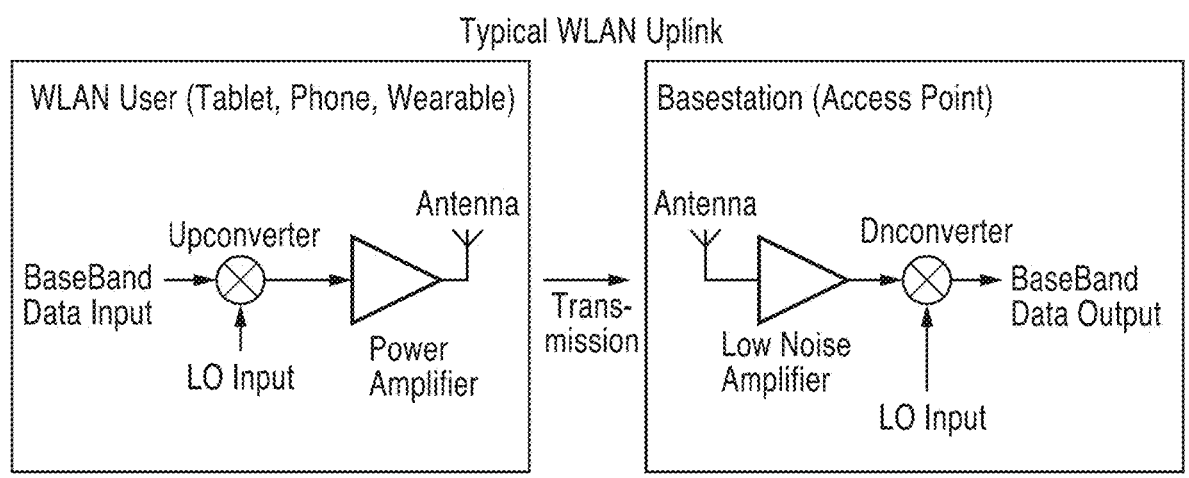
FIG. 1 is a block diagram of a typical existing WLAN, WiFi, Bluetooth or cellular link.
Figure 2A:
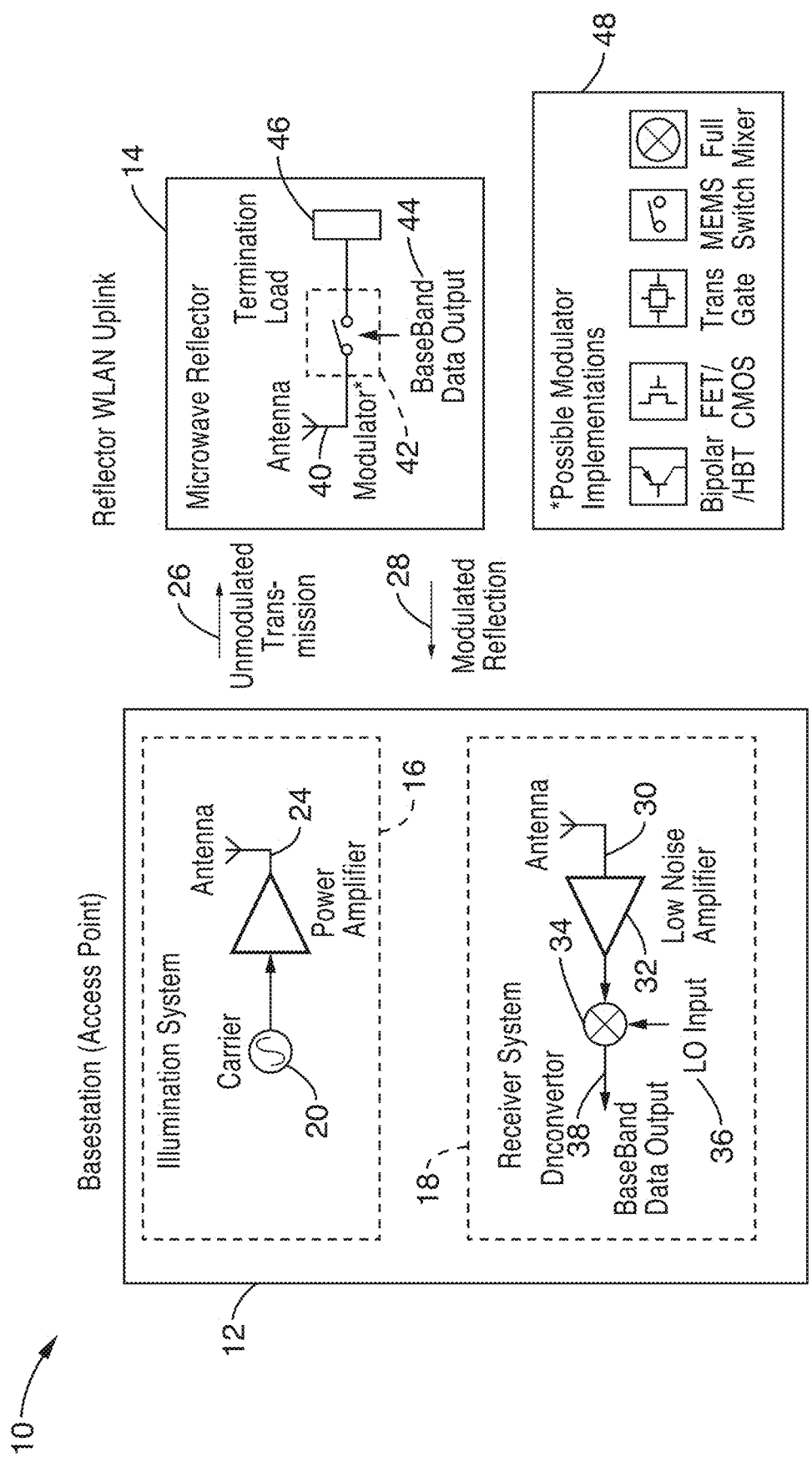
FIG. 2A and FIG. 2B are block diagrams showing microwave reflector links (MRLs) according to embodiments of the present disclosure.
Figure 2B:
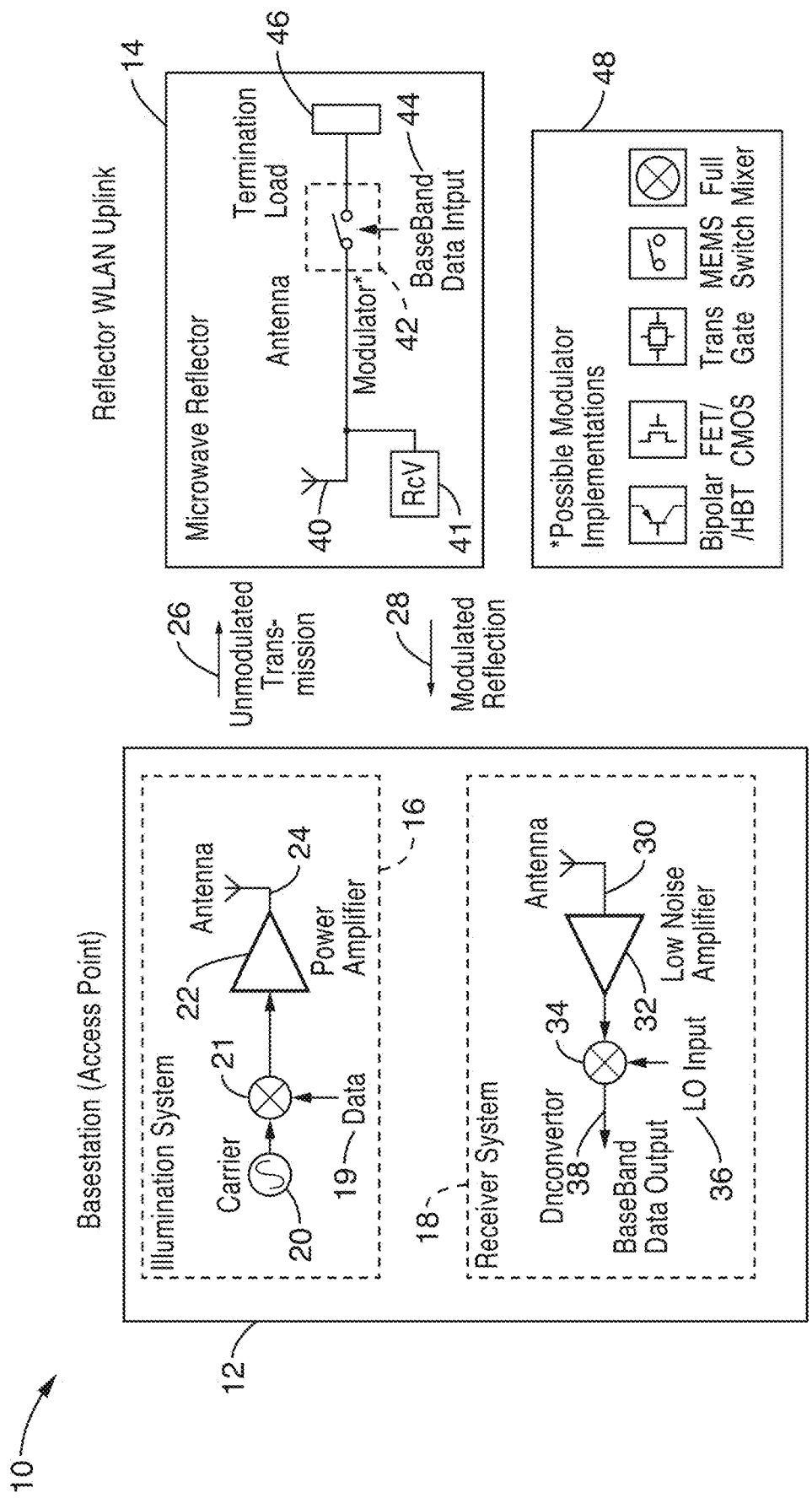

FIG. 2A and FIG. 2B illustrate example embodiments 10 of a microwave reflector link (MRL), that can overcome the need to carry the power amplifier and its high power consumption in a wearable or other device. For the sake of convenience, all the embodiments of the present disclosure are described as being at microwave frequencies, however, it will be appreciated that the present disclosure can be implemented to operate at very high RF frequencies as well (e.g., UHF and in some applications even VHF).

In FIG. 2A a base station (access point) 12 is seen along with a microwave reflector 14. By way of example and not limitation, the reflector link is seen as a short range (local) wireless uplink, which is often referred to generically as a WLAN. The MRL is particularly well-suited for use in specific communication systems, such as WiFi, WLAN, Bluetooth, Cellular and other data-links. The example system depicts three main components described below, but is not limited to systems having these specific components.

A microwave illuminator 16 is seen at or within base-station 12 (access point), wireless router, or other wireless network access point end which provides the RF/microwave power used to illuminate or excite a reflector module 14. The illuminator is shown with a carrier generation circuit 20 coupled into a power amplifier 22 whose output is directed to an antenna 24. Illuminator 16 transits continuous-wave (CW) power at a microwave frequency which will be modulated by the reflector module.

A microwave reflector 14 is placed at, within, or integrated into a wearable device. The reflector captures microwave power on its antenna 40 as sent by illuminator 16 and either reflects or absorbs the incident radiation depending on the termination condition of the antenna, which is set by modulator 42. The microwave reflector link (MRL) is seen in reflector 14 with antenna 40 coupled through a modulator 42, whose state is modulated by a baseband data input 44, with modulator 42 coupled to a termination load 46.

The modulator of this reflector can be implemented in a variety of different ways 48 as will be known to one of ordinary skill in the art. By way of example and not limitation, the modulator can be implemented in a number of ways, including use of a single switching device, such as a single transistor (e.g., Bipolar, HBT, CMOS, HEMT), other three terminal device, a transmission gate, a full mixer (passive, resistive or Gilbert cell), or even as MEMS or other mechanical switches.

The base station 12 contains a microwave receiver 18, placed at, or within a router, base-station or other wireless network access point. Receiver 18 is seen with antenna 30 coupled to a low-noise amplifier 32 with an output coupled to a downconverter 34 with local oscillator (LO) input 36, which generates a baseband data output 38. The receiver captures the modulated reflection from the reflector module and converts it back to baseband data through a down-conversion process. The down-conversion process is known in the art and found in WiFi or other wireless links.

In FIG. 2B an embodiment 10 of the MRL is shown for the case in which data is being transmitted from the illumination system to the MRL. One of ordinary skill in the art will appreciate that the signal driving the illuminator transmission may be mixed with outgoing data, such as mixed, time-duplexed, and so forth, so that data can be carried to the wearable end of the link. In the figure, a modulator (mixer) 21 is shown mixing output from the carrier signal 20 with data 19 to be transmitted to the MRL. At MRL 14 a receiver section 41 is shown coupled to the antenna 40, and would be configured with receiver and demodulator circuitry. The receiver is configured with sufficiently high impedance that it does not adversely impact the state changes between reflection and absorption of the antenna which is being utilized to communicate back to the illumination system. One of ordinary skill in the art will recognize that there are numerous ways to interpose, encode, mix, and/or modulate data within an outgoing microwave signal, and to receive and decode that data on the reception side, any of these techniques and combination thereof may be utilized herein without departing from the teachings of the present disclosure. In addition, it should be appreciated that the inclusion of a data communication path from illuminator to MRL reflector is applicable to all of the embodiments of the present disclosure. Accordingly, for the sake of simplicity of illustration, data communication between illuminator and MRL is not shown in the subsequent embodiments described herein.

1.2. Operation of Microwave Reflector Link.

The illuminator 16 of FIG. 2A and FIG. 2B shines (directionally emits) a continuous wave (CW) signal 26 from antenna 24 at microwave (or RF) frequencies in the direction of the microwave reflector from a base-station, or other network access point. The directionality of transmission 26 can be accomplished with a horn antenna, patch antenna, or other similar high-gain (>5 dBi) structure. Generation of the carrier can either be through use of a phase-lock loop or other synthesizer, or even a free running oscillator. A power amplifier 22 may or may not be required in the illuminator to meet link signal-to-noise ratio (SNR) requirements. In at least one embodiment, the illuminator is time duplexed, or otherwise mixed, to also carry data as was seen in FIG. 2B, such as by adding a mixer to mix in the data prior to transmission, however, this is not required for basic operation.

The microwave reflector 14 is preferably placed at, placed on, or placed within, (i.e., placed at, coupled to, or integrated within) the wearable device. Once the transmitted power arrives at microwave reflector 14, modulator 42 modifies the termination condition, as non-terminated or terminated through load 46, according to the data pattern to be sent which is shown in response to baseband data input 44, to produce modulated reflection signal 28. It will be noted that modulator 42 is modulated with the data to be returned to the base-station, (or network access point). Explaining this process in terms of a simple switch, when the modulator is in the open condition, the antenna is essentially unterminated and reflects a large portion of the power back to the base-station. When the modulator is in the closed condition, the antenna is connected to the termination load, and very little power is reflected. In this way modulation can be accomplished. The termination can be implemented as a stub, transmission line or even lumped element circuit design. It should be noted that the termination condition can be made complex to enable reflection of multiple different phases and amplitudes to enable QAM operation. Accordingly, communication link is established back from the WLAN in response to the power reflected back to the base station or network access point, as the microwave reflector link 14 modulates 42 the termination condition of the antenna 40 according to the data pattern 44 to be sent.

As the modulator is controlled by the incoming data, the signal reflected to the receiver at the base-station or network access point will be modulated by the data applied to the modulator input. It should be appreciated that this data may be in either a positive or negative sensing polarity depending on both the modulator configuration, and geometric placement of both the base-station (or network access point) and the wearable device or other WLAN user containing the reflector with modulator. Interference of unmodulated reflection from other background or foreground objects also affects the polarity depending on the relative strength of these reflections when compared to the modulated signal.

It should be appreciated that in all the embodiments of the present disclosure, the modulator may be configured to provide more than two different reflection levels, such as based on more than the two different termination conditions of non-terminated or terminated. Thus, data can be alternatively communicated as bits with three states, four states, or even more states depending on the number of different reflection levels incorporated. However, generally speaking the signal to noise ratio will be reduced as the number of reflection states supported increases beyond two.

1.3 Alternative Non-Coherent Link Reflector System.

Figures 3, 4:
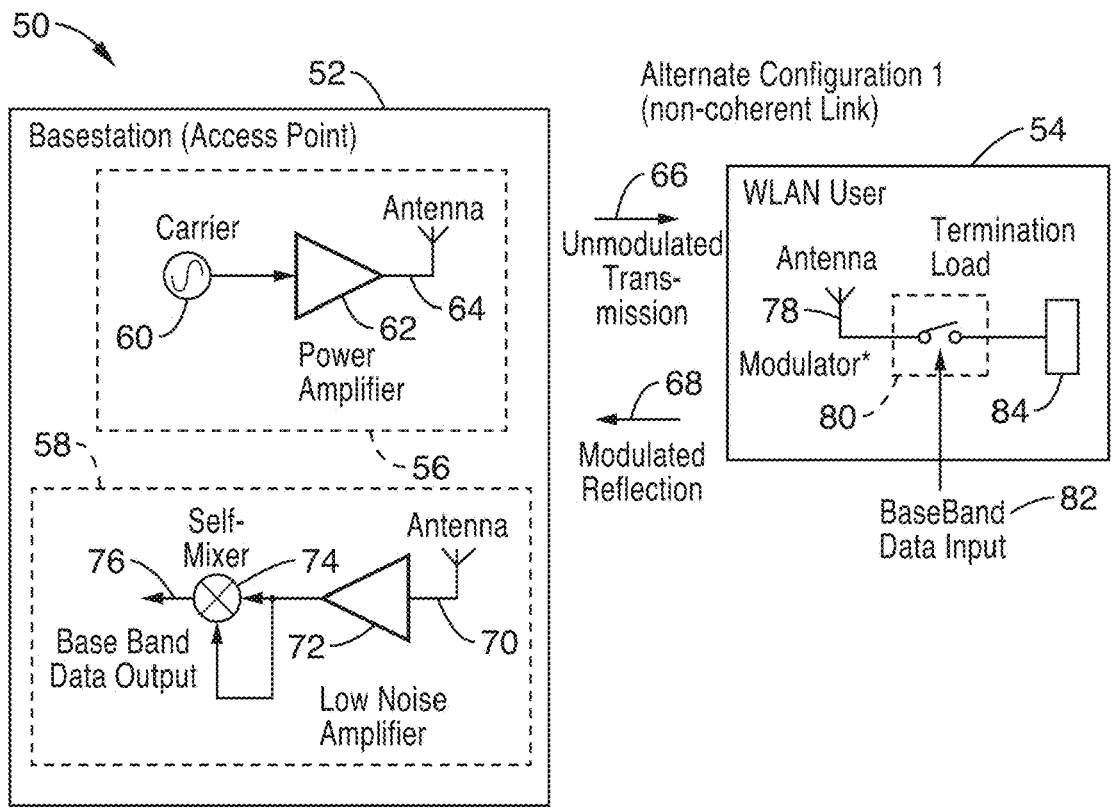
FIG. 3 is a block diagram showing a microwave reflector link (MRL) in a non-coherent configuration according to an embodiment of the present disclosure.
FIG. 4 is a block diagram showing a microwave reflector link (MRL) in a dynamic reflector configuration according to an embodiment of the present disclosure.

FIG. 3 illustrates an example embodiment 50 of an alternative reflective microwave data-link 54 configured in a non-coherent configuration. In this case, the coherent down-conversion with local oscillator (LO) signal (within the receiver) is replaced with a self-mixer or other power detector (Rectification based, push-push based, or full Gilbert cell) and the carrier generation in the illuminator can be either coherent (phase-locked) or free running.

In particular the figure depicts a base station (access point) 52 configured for establishing a non-coherent link with a WLAN user 54. A transmitter 56 is seen with carrier 60, amplified 62, to antenna 64 for generating an unmodulated transmission 66 directed toward WLAN user 54. The reflective link 54 is seen with antenna 78 coupled through modulator 80, modulated by base band data input 82, to a termination load 84. The modulated reflection 68 from the WLAN user is received at receiver 58 by an antenna 70 coupled to a low noise amplifier 72 coupled to a self-mixer 74, which outputs a base band data output 76.

The microwave reflector and modulator combination need not be based on termination condition. Thus, any switch or modulator placement which influences the reflection can be utilized in this and other embodiments of the present disclosure without departing from its teachings.

1.4 Alternative Dynamic Reflector Link System.

FIG. 4 illustrates an example embodiment 90 in which a base station (access point) 92, having a transmitter 96 and receiver 98, generates an illumination signal to microwave data-link 94 as a dynamic reflector. In this example the transmitter of base station (access point) 92 is exemplified with a carrier 100 coupled through an amplifier 102 to an antenna 104 to generate unmodulated transmission 106 to the WLAN user 94.

The transmissions are received in reflector 94 on a first antenna segment 118 coupled through a modulator 120, modulated by a base band data input 122, to a second antenna segment 124 from which a modulated reflection 108 is generated back to the receiver 98 in base station (access point) 92. Modulated reflections are received by antenna 110 in receiver 98, then amplified 112 and output to a self-mixer 114 to output a base band data output 116.

By way of example and not limitation a prototype link was implemented comprising two antenna sections connected together (e.g., over-moded dipole antennas) using the modulator (connected in a first state and disconnected in a second state). The two sections need not utilize the same type of antenna. It should also be appreciated that any desired type of modulator and any desired type of antenna structure (horn, patch, dipole, monopole, loop) and even using antenna arrays, may be utilized in this and other embodiments of the present disclosure.

Additionally, more than two antenna segments can be implemented with any possible number of array sections and any possible number of modulators connecting and disconnecting them. It is important, however, that the reflection co-efficient of the overall microwave reflector is changed (modulated) by the modulator action. It should be noted that the modulator in this embodiment, and all embodiments described herein, is not limited to binary states (two states), as multiple analog states (e.g., for QAM or PAM operation) can be utilized without departing from the present disclosure. It will also be appreciated that at least one embodiment utilizes frequency modulating of the reflector to provide orthogonal frequency division multiplexing (OFDM) operation.

Figure 5:
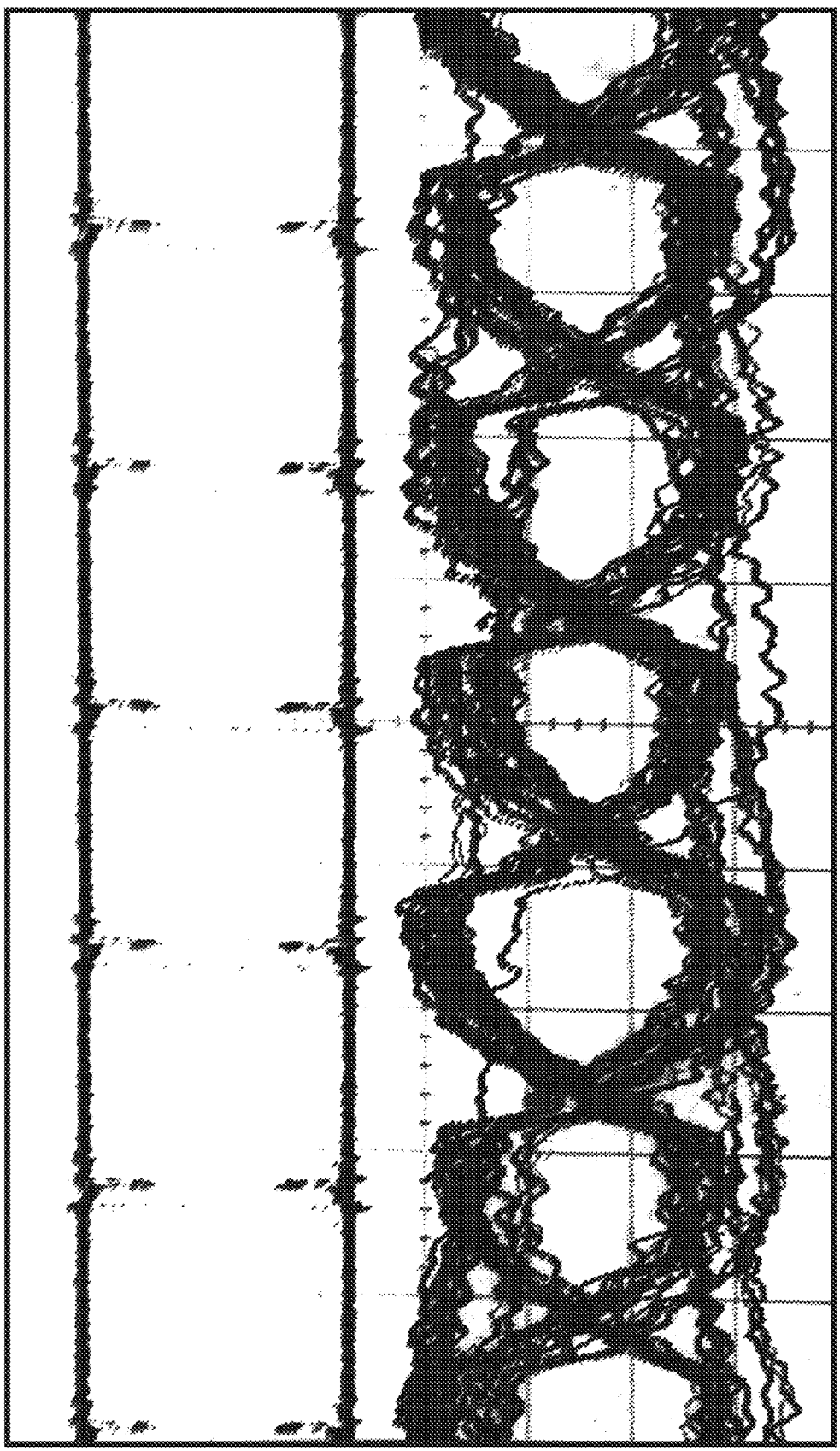
FIG. 5 is a plot of attainable data transmission and an eye-diagram for an example microwave reflector link (MRL) according to an embodiment of the present disclosure.

FIG. 5 illustrates data transmission obtained in the above test seen in FIG. 4 without the CDMA coding, and depicts an eye-diagram with a data-rate of 3.0 Mb/s. It should be appreciated that the present disclosure is in no way limited to these depicted low transmission speeds, as these speeds were only chosen for convenience based on what test equipment was readily available for testing the technology.

2.0 CDMA Spread-Spectrum Reflector Apparatus.

In the above sections are described a technology that allows eliminating WLAN user power amplifiers and enables implementation of wireless links (e.g., WLAN, WiFi, Bluetooth, etc.) that consumes a factor of ten to one-hundred times (10-100×) less power, making it compatible with the limited battery resources of wearable devices, and other low power applications.

However, the overall communication performance of this system can still be heavily limited by the ambient carrier reflection which appears as an in-band signal blocker or jammer. We have discovered key properties that limit performance in the above described reflective link (data rate, transmission distance).

Figure 6:
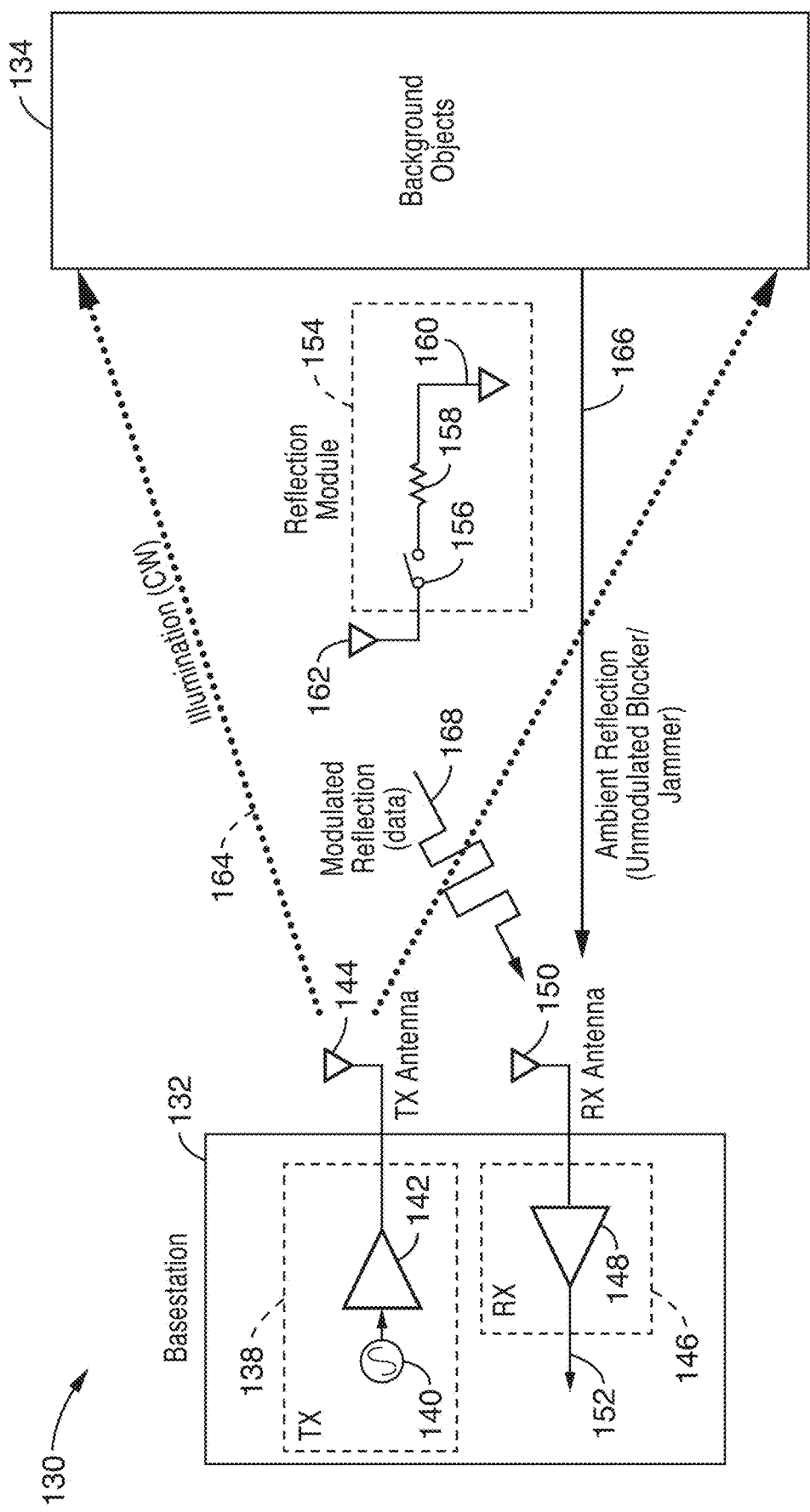
FIG. 6 is a block diagram of how ambient reflection blockers arise in reflection based communication links, which are overcome according to embodiments of the present disclosure.

FIG. 6 illustrates an example embodiment 130 of operating the reflective link described in the previous sections. The diagram is similar to that shown in FIG. 2, and depicts a base station 132, a reflective module 154 within an environment containing significant background objects 134. Base station 132 is shown with a transmitter 138 having a carrier 140 directed through an amplifier 142 to an antenna 144 to generate a continuous wave (CW) illumination 164 to reflection module 154, but which is also reflected from background objects 134. Reflection module 154 receives the carrier on its antenna 162 which is coupled to a modulator 156 to a termination, depicted as a load 158 coupled to ground 160. Modulation of switch 158 changes the amount of signal reflected from the reflection module and carries data back as a modulated reflection 168 to base station 132, as received by receiver 146 having antenna 150 coupled to an amplifier 148 outputting the data 142.

As previously described, when the reflective link operates, power from the transmitter is received by the reflector module, allowing it to operate and communicate data back to the base station in response to the modulated reflection 168. However, instead of striking the microwave reflector link (MRL), a much larger portion of the transmitted power strikes other objects 134 within the environment (e.g., floor, ceiling, walls, etc.), which also reflect the RF power back to the base-station receiver as ambient reflection 166. Yet, this ambient reflection contains unmodulated power which appears as a CW-tone directly in the center of the received bandwidth.

As the majority of the power at the receiver input is this blocker power (well over 99.99%), it can overwhelm the receiver front-end through a well-known process called receiver desensitization. In this case, the low noise amplifier (LNA) or mixer in the front end of the receiver becomes saturated and exhibits an apparent drop in gain and noise figure performance. In essence, this unmodulated CW tone or ambient reflection acts like a jammer or in-band blocker, which limits link performance.

Figure 7:
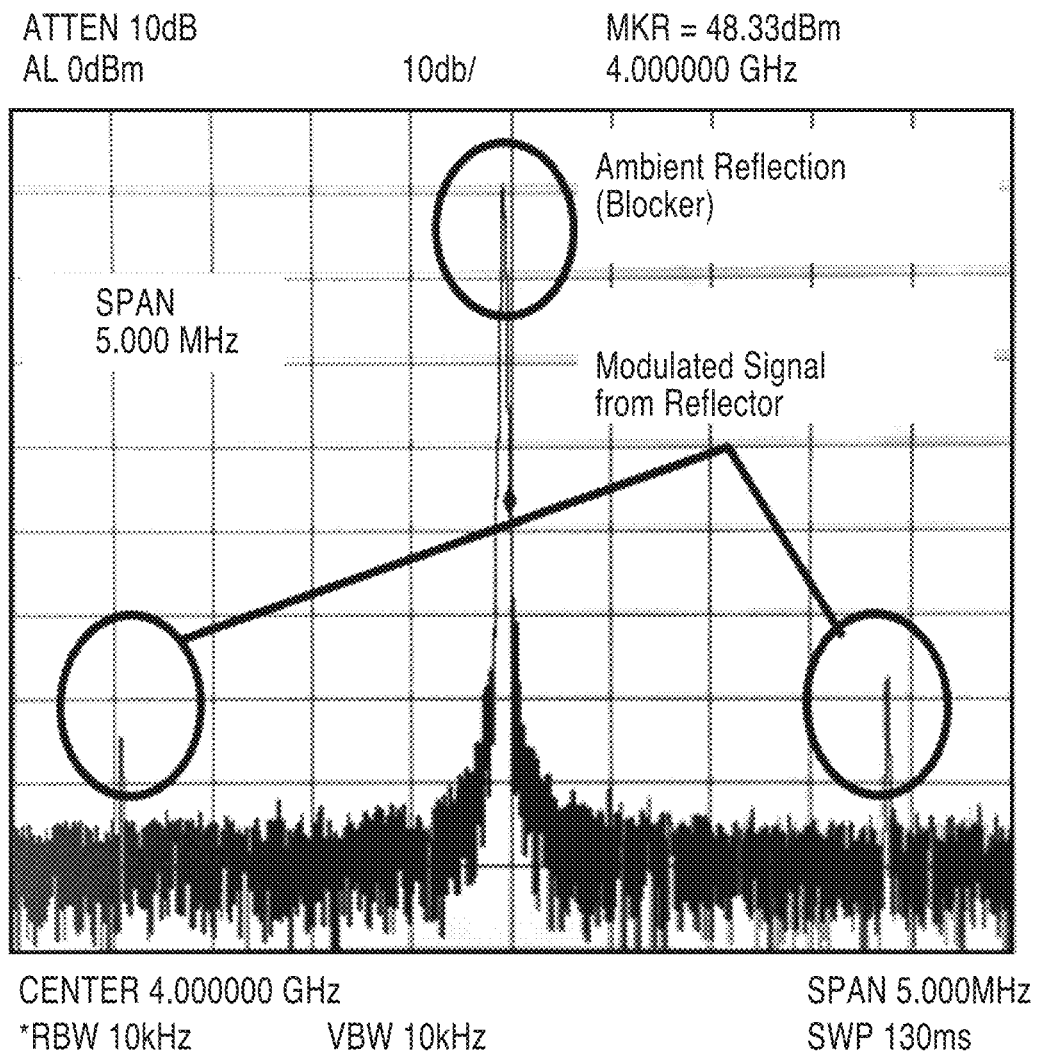
FIG. 7 is a plot of measured ambient reflection blockers in reflective based communication link.

FIG. 7 depicts a plot of attenuation for indoor measurements performed on the reflector link described in the prior sections. It can be seen that the blocker (circled center peak) is over 30 dB stronger than the small ASK modulated signal produced (circled peaks seen on either side of the center peak) by our reflector module. The following section describes an embodiment which overcomes the above performance limitations in applications having significant background reflections.

Figure 8:
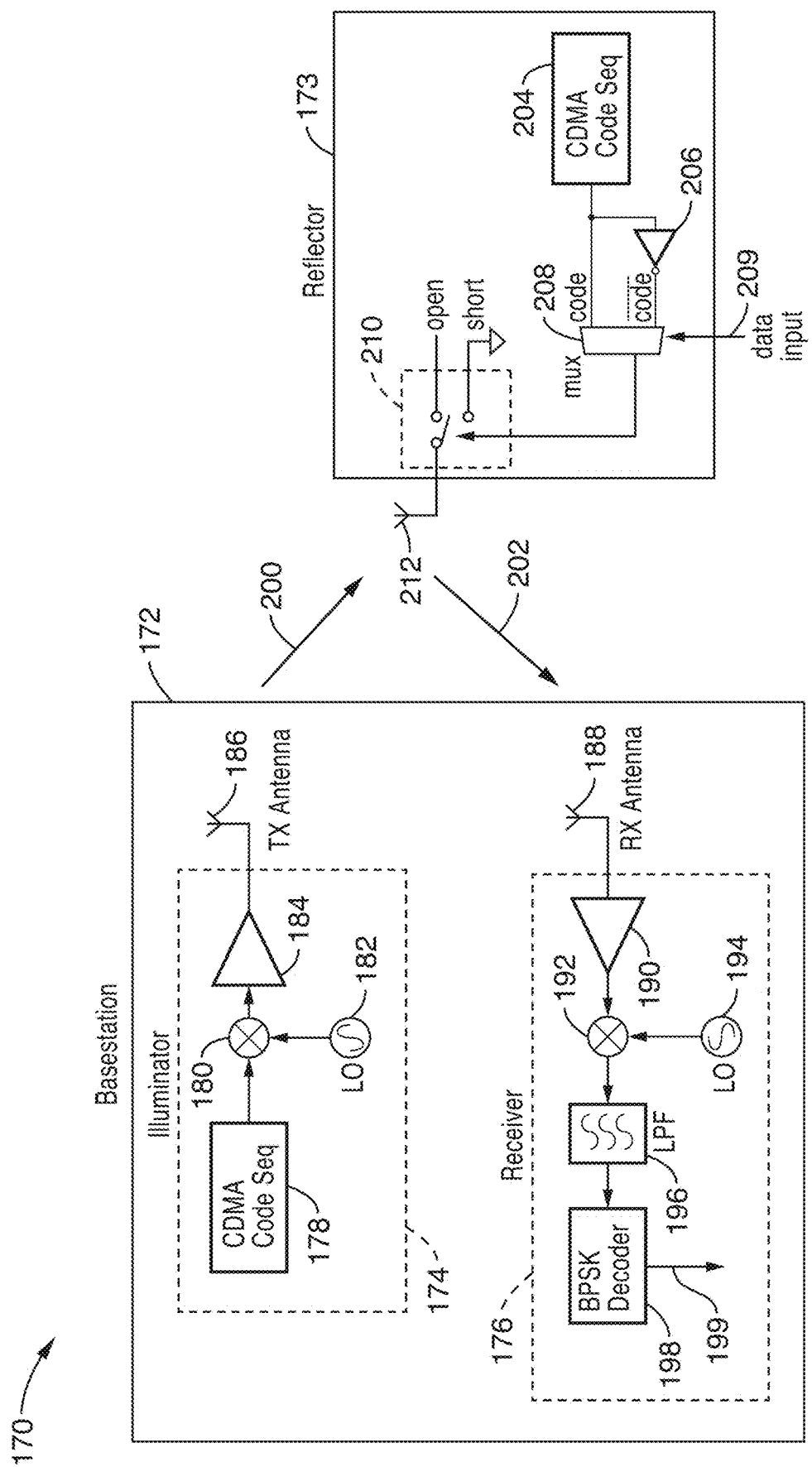
FIG. 8 is a block diagram of a CDMA spread spectrum based reflector link to suppress the ambient reflection blocker according to an embodiment of the present disclosure.

FIG. 8 illustrates an example embodiment 170 of an alternative reflective link architecture that overcomes the blocker problem between a base station 172 and reflector 173. An illuminator is seen 174 having a code generator 178, exemplified as a code division multiple access (CDMA) code sequence that is output to an upconverter (mixer) 180 receiving a LO signal 182 with output through an amplifier 184 to antenna 186 to generate an illumination 200. Reflector 173 is seen receiving this CDMA encoded illumination 200 at antenna 212 which is coupled to a modulator 210, seen coupling to an open or short selected in response to output from a multiplexer 208 having a selector input as data input 209 and input signal of code and code' (a signal and its inverse, such as through an inverter 206) from CDMA code sequence 204 generator. A reflected output 202 is generated from reflector 173 and received by a receiver 176 on base station 172. The encoded signal from the reflector is received at a receiver antenna 188, which is amplified 190, and passed through a demodulator (mixer) 192 receiving LO signal 194. The demodulated output passes through a filter 196, herein depicted as a low-pass filter (LPF) prior to receipt by a decoder 198, exemplified as using binary phase shift keying (BPSK), to generate decoded data output 199 as received from the microwave reflector of the WLAN user.

Accordingly, in this system architecture, the transmitter (illuminator) is modulated with a CDMA code signal (spreading signal), such is preferably at a spreading rate of at least ten to one hundred time (10-100×) beyond the data rate of the reflective link (e.g., at least 10:1 spreading). As the signal is modulated with the spreading signal, it now occupies a much larger bandwidth and appears like a BPSK modulated signal carrying the spreading code occupying a wide spectral bandwidth.

The reflector end of the link contains a single reflector switch (modulator) 210 which selects between one of two antenna termination conditions or states (open and shorted). In the open position, the incident signal is reflected without a phase change, while in the shorted (closed) condition the incident signal is reflected after incurring a 180 degree change in phase. The reflector switch is continuously modulated with the same spreading code as is used in the transmitter essentially allowing de-spreading of the signal to occur at the reflector.

The data to be relayed back to the base station is used to control a multiplexer (mux) which selects whether the de-spreading code or its inversion is used to modulate the reflector. Since the spreading code is the same as the one employed within the transmitter, the resulting signal from the reflector is a de-spread continuous sine wave. However, the carrier phase (0 degrees or 180 degrees) is dependent on the data input signal which selects whether the spreading code or inverse spreading code is used to modulate the reflector. The result of this process is a BPSK signal returned from the reflector that is much narrower (un-spread signal) at the data rate of the reflector. The ambient reflection is a superimposed copy of the much wider transmitted signal, which is then filtered out by a low pass filter in the base-station receiver.

Figure 9A:
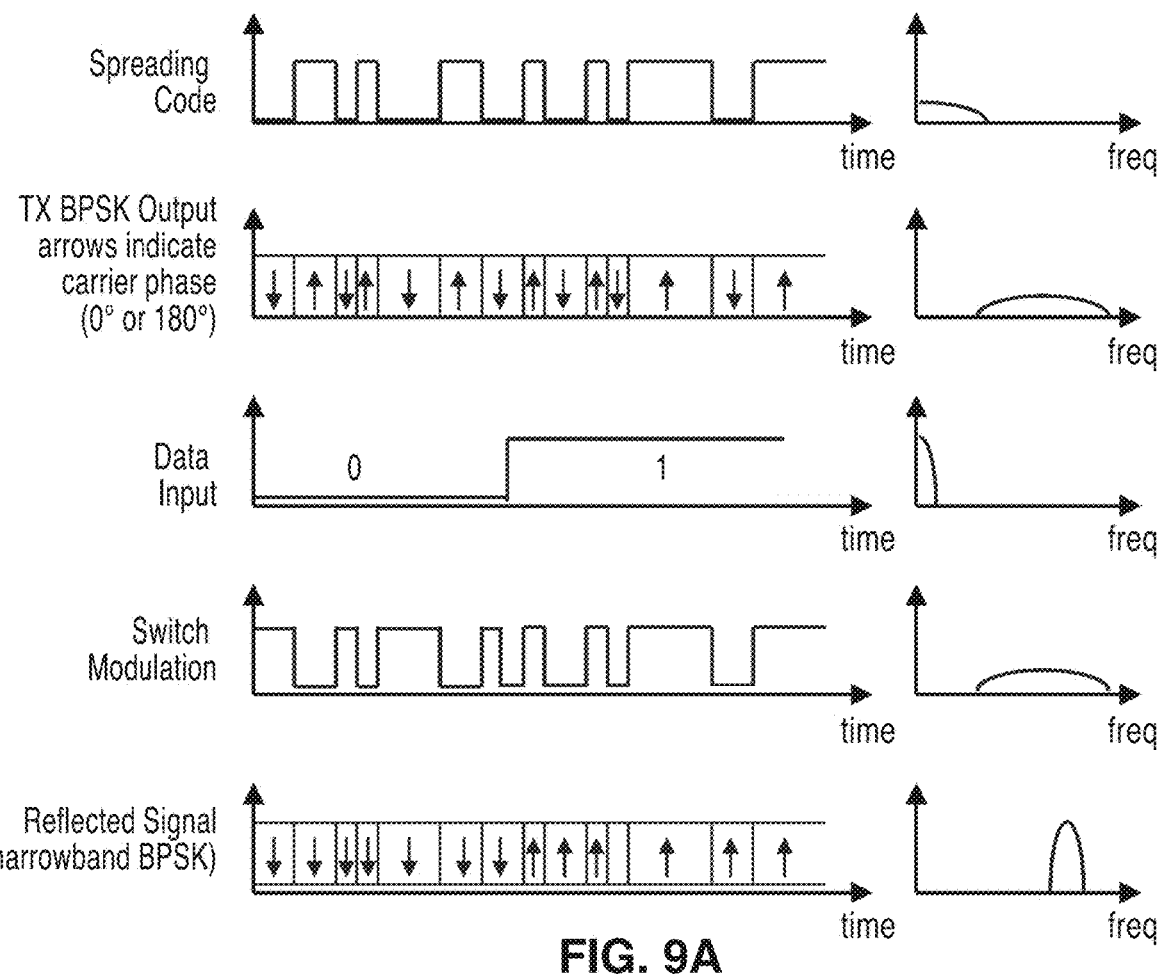
FIG. 9A through FIG. 9C are plots of select time domain and frequency domain signals associated with the reflection blocker suppression technology of the present disclosure.
Figure 9B:
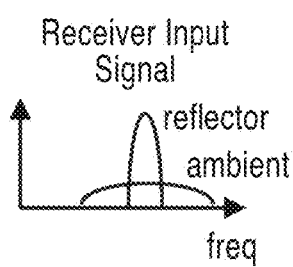
Figure 9C:
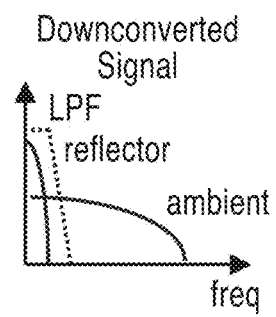

FIG. 9A through FIG. 9C illustrate waveforms and spectra at nodes within FIG. 8 to better understand these relationship between the signals and circuit elements. In particular, moving down through the waveforms rows seen in FIG. 9A, the uppermost waveform depicts a spreading code that is generated from CDMA code sequence generator 178 in FIG. 8. The next waveform depicts a Tx BPSK output signal is seen from illuminator Tx antenna 186. The next waveform down depicts a data input signal 209 is seen for controlling multiplexor 208. The next waveform depicts a switch modulation signal seen coupled to switch (modulator) 210 coupled to reflector antenna 212. And the lowermost signal depicts a reflected signal (narrowband BPSK) seen as signal 202 directed back from reflector 173 to the base station 172. In FIG. 9B is shown spectra of the receiver input signal, as seen at Rx antenna 198 in receiver 176 of base station 172, showing the frequency distribution of the signal from the reflector compared to the ambient signal reflection. In FIG. 9C is seen the downconverted signal spectra after the low pass filter (LPF) 190 of receiver 176 of base station 172, showing that the signal from the reflector is selected within the LPF, this excluding the majority of ambient signal contribution.

From the description herein, it will be appreciated that the present disclosure encompasses multiple embodiments which include, but are not limited to, the following:

1. A microwave reflector link system for wireless local communication, the system comprising: (a) a microwave illuminator, said microwave illuminator including a microwave signal source as input to a power amplifier whose output is coupled to an antenna; (b) a microwave reflector, said microwave reflector including an antenna and a modulator coupled to said antenna; and (c) a microwave receiver; (d) wherein said microwave illuminator is configured to transmit power to said microwave reflector for illuminating or exciting said microwave reflector; (e) wherein said microwave reflector is configured to receive power from said microwave illuminator and to reflect or absorb that power as a function of termination state of its antenna, wherein the termination state of its antenna is controlled by said modulator, wherein said microwave reflector is configured to receive a broadband data input from said microwave illuminator and to reflect modulated data; and (f) wherein said microwave receiver is configured to receive modulated data reflected from said microwave reflector and convert the modulated data to broadband data.

2. The system of any preceding embodiment, wherein said microwave reflector is configured for communicating data back to said microwave receiver without requiring a power amplifier to drive an output transmission, as these output transmissions are driven in response to the state of termination of the antenna determining the extent to which signals from the microwave illuminator are reflected back to be received by the microwave receiver.

3. The system of any preceding embodiment, wherein termination state of said antenna is modulated between a non-terminated open condition, or a terminated condition connected to a termination load.

4. The system of any preceding embodiment, wherein termination state of said antenna is modulated between multiple different antenna configurations.

5. The system of any preceding embodiment, wherein said two antenna configurations comprise connection of said antenna as a first antenna segment, with a modulated connection to a second antenna segment.

6. The system of any preceding embodiment, wherein said microwave signal source comprises a carrier signal which is either modulated or unmodulated with outgoing data, depending on whether data is being transmitted to said microwave reflector or not.

7. The system of any preceding embodiment, further comprising a receiver and demodulator coupled to said antenna of said microwave reflector for receiving and extracting data transmitted in from said microwave illuminator.

8. The system of any preceding embodiment, wherein said wireless local communications is selected from the group of wireless communication types consisting of Wi-Fi, WLAN, Bluetooth, and Cellular communications.

9. The system of any preceding embodiment, wherein said microwave illuminator is configured for placement at, or placement within, or integrated within, a base-station, wireless router, or other wireless network access point or wireless link.

10. The system of any preceding embodiment, wherein the microwave illuminator is configured to transmit continuous wave (CW) power at a microwave frequency which will be modulated by the microwave reflector module.

11. The system of any preceding embodiment, wherein the microwave reflector is configured to be placed at, coupled to, or integrated within a wearable electronic device.

12. The system of any preceding embodiment, wherein the microwave reflector is selected from a group of devices consisting of: (a) bipolar, HBT, CMOS, HEMT, or other three-terminal devices; (b) a transmission gate; (c) a full mixer (passive, resistive or Gilbert cell); and (d) a mechanical switch.

13. The system of any preceding embodiment, wherein said microwave receiver is configured to be placed at, or placed within, or integrated within, a router, base-station or other wireless network access.

14. The system of any preceding embodiment, wherein said reflector switch is modulated to provide different amounts of phase change in response to the different termination states.

15. The system of any preceding embodiment: further comprising a spreading code source utilized in said microwave illuminator and said microwave reflector; wherein said spreading code source is coupled for modulating termination state of said reflector switch wherein so that said reflector apparatus performs de-spreading of an input signal received at said antenna input; wherein said reflector apparatus reflects a signal that is a de-spread continuous sine wave; and wherein a narrow phase shift signal is returned from said microwave reflector which is readily discerned from ambient reflections which are received as a superimposed copy of a much wider input signal.

16. A spread spectrum reflector apparatus for reducing unmodulated ambient blockers in reflected data links, the apparatus comprising: (a) an antenna input; (b) a reflector switch coupled to the antenna input, the reflector switch configured for modulating a termination state of said antenna input so that an input signal is reflected with different amounts of phase change depending on said termination state; and (c) a spreading code source having the same spreading code as in the input signal received at the antenna input; (d) wherein said reflector switch is continuously modulated with code from said spreading code source; (e) wherein said reflector apparatus performs de-spreading of an input signal received at the antenna input to occur at the reflector switch; and (f) wherein said reflector apparatus reflects a signal that is a de-spread continuous sine wave.

17. The apparatus of any preceding embodiment, wherein said modulating termination state of said antenna input comprises a reflector switch for modulating termination state between an open termination state and a shorted termination state.

18. The apparatus of any preceding embodiment, wherein with said reflector switch in a first termination state an input signal received at the antenna input is reflected without a phase change, while with said reflector switch in a second termination state an input signal received at the antenna input is reflected after incurring a 180 degree change in phase.

19. The apparatus of any preceding embodiment, wherein the reflected signal has a carrier phase of 0 degrees or 180 degrees that is dependent on the data input signal which selects whether the spreading code or inverse spreading code is used to modulate the reflector switch.

20. The apparatus of any preceding embodiment, wherein said reflector switch is continuously modulated with code from said spreading code source in response to a multiplexer having a first code input coupled to said spreading code source and a second code input coupled to said spreading code source through an inverter.

21. The apparatus of any preceding embodiment, wherein an output of said multiplexer is coupled to said reflector switch, and has a data input to control selection of whether said reflector switch is modulated with the spreading code or an inverse of the spreading code.

22. The apparatus of any preceding embodiment, wherein a phase shift signal is returned from the reflector switch that is much narrower, as it is an un-spread signal, at the data rate of the reflector.

23. The apparatus of any preceding embodiment, wherein the narrower phase shift signal is readily discerned from ambient reflections which are received as a superimposed copy of a much wider input signal.

24. The apparatus of any preceding embodiment, wherein said apparatus is a component of a communications system comprising a base station having a transmitter and a receiver.

25. The apparatus of any preceding embodiment, wherein said signals transmitted from the base station are reflected to the receiver by the reflector apparatus to cancel reflected blocker signals.

26. The apparatus of any preceding embodiment, wherein said spread spectrum reflector apparatus is configured for communicating data back to a microwave receiver without requiring a power amplifier to drive an output transmission, as these output transmissions are driven in response to the state of termination of the antenna determining the phase shift and/or extent to which signals from a microwave illuminator are reflected back to be received by the microwave receiver.

27. The apparatus of any preceding embodiment, further comprising a receiver and demodulator coupled to said antenna of said spread spectrum microwave reflector for receiving and extracting data transmitted from a microwave illuminator.

28. The apparatus of any preceding embodiment, wherein said spread spectrum reflector apparatus is configured for operating in a wireless local data link selected from the group of wireless communication types consisting of Wi-Fi, WLAN, Bluetooth, and Cellular communications.

29. The apparatus of any preceding embodiment, wherein said spread spectrum reflector apparatus is configured to be placed at, coupled to, or integrated within a wearable electronic device.

30. A method of wireless local microwave communication, comprising: (a) generating a microwave frequency illumination from a microwave illuminator; (b) receiving said microwave illumination on an antenna of a microwave reflector; and (c) transmitting data from said microwave reflector to a microwave receiver, in response to modulating termination state of said antenna of said microwave reflector between different termination states of said antenna; (d) wherein the microwave receiver is configured to receive modulated data reflected from said microwave reflector and convert the modulated data to broadband data.

31. The method of any preceding embodiment, wherein said microwave reflector is configured for communicating data back to said microwave receiver without requiring a power amplifier to drive an output transmission, as these output transmissions are driven in response to the state of termination of the antenna on said microwave reflector determining extent to which signals from said microwave illuminator are reflected back to be received by the microwave receiver.

32. The method of any preceding embodiment, wherein termination state of said antenna is modulated between a non-terminated open condition, or a terminated condition connected to a termination load.

33. The method of any preceding embodiment, wherein termination state of said antenna is modulated between multiple different antenna configurations.

34. The method of any preceding embodiment, wherein said microwave illuminator outputs a carrier signal which is either modulated or unmodulated with outgoing data, depending on whether data is being transmitted to said microwave reflector or not.

35. The method of any preceding embodiment, wherein said microwave reflector is further configured for receiving and demodulating a modulated carrier signal from said microwave illuminator for extracting data transmitted from said microwave illuminator.

36. The method of any preceding embodiment, wherein said method of wireless local microwave communication is configured for performing communications selected from the group of wireless communication types consisting of Wi-Fi, WLAN, Bluetooth, and Cellular communications.

37. The method of any preceding embodiment, wherein said microwave illuminator is configured for placing at, or placing within, or integrating within, a base-station, wireless router, or other wireless network access point or wireless link.

38. The method of any preceding embodiment, wherein the microwave illuminator is configured to transmit continuous wave (CW) power at a microwave frequency which will be modulated by the microwave reflector module.

39. The method of any preceding embodiment, wherein the microwave reflector is configured for placing at, coupling to, or integrating within a wearable electronic device.

40. The method of any preceding embodiment, wherein the microwave receiver is configured for placing at, or placing within, or integrating within a router, base-station or other wireless network access.

41. The method of any preceding embodiment, wherein modulating of the reflector switch provides different amounts of phase change in response to the different termination states.

42. The method of any preceding embodiment: further comprising incorporating a spreading code source in said microwave illuminator and said microwave reflector; modulating termination state of said reflector switch in response to said spreading code source, wherein the reflector apparatus performs de-spreading of an input signal received at the antenna input; reflecting a signal that is a de-spread continuous sine wave from the reflector apparatus; and returning a narrow phase shift signal from said microwave reflector which is readily discerned from ambient reflections which are received as a superimposed copy of a much wider input signal.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A spread spectrum reflector apparatus for reducing unmodulated ambient blockers in reflected data links, the apparatus comprising:
    (a) an antenna input;
    (b) a reflector switch coupled to the antenna input, the reflector switch configured for modulating a termination state of said antenna input so that an input signal is reflected with different amounts of phase change depending on said termination state; and
    (c) a spreading code source having the same spreading code as in the input signal received at the antenna input;
    (d) wherein said reflector switch is continuously modulated with code from said spreading code source;
    (e) wherein said reflector apparatus performs de-spreading of an input signal received at the antenna input to occur at the reflector switch;
    (f) wherein said reflector apparatus reflects a signal that is a de-spread continuous sine wave; and
    (g) wherein said reflector switch is continuously modulated with code from said spreading code source in response to a multiplexer having a first code input coupled to said spreading code source and a second code input coupled to said spreading code source through an inverter.

2. The apparatus as recited in claim 1, wherein said modulating termination state of said antenna input comprises a reflector switch for modulating termination state between an open termination state and a shorted termination state.

3. The apparatus as recited in claim 2, wherein with said reflector switch in a first termination state an input signal received at the antenna input is reflected without a phase change, while with said reflector switch in a second termination state an input signal received at the antenna input is reflected after incurring a 180 degree change in phase.

4. The apparatus as recited in claim 1, wherein the reflected signal has a carrier phase of 0 degrees or 180 degrees that is dependent on the data input signal which selects whether the spreading code or inverse spreading code is used to modulate the reflector switch.

5. The apparatus as recited in claim 1, wherein an output of said multiplexer is coupled to said reflector switch, and has a data input to control selection of whether said reflector switch is modulated with the spreading code or an inverse of the spreading code.

6. The apparatus as recited in claim 1, wherein said apparatus is a component of a communications system comprising a base station having a transmitter and a receiver.

7. The apparatus as recited in claim 6, wherein signals transmitted from the base station are reflected to the receiver by the reflector apparatus to cancel reflected blocker signals.

8. The apparatus as recited in claim 1, wherein said spread spectrum reflector apparatus is configured for communicating data back to a microwave receiver without requiring a power amplifier to drive an output transmission, as these output transmissions are driven in response to the state of termination of the antenna determining the phase shift and/or extent to which signals from a microwave illuminator are reflected back to be received by the microwave receiver.

9. The apparatus as recited in claim 1, further comprising a receiver and demodulator coupled to said antenna of said spread spectrum microwave reflector for receiving and extracting data transmitted from a microwave illuminator.

10. The apparatus as recited in claim 1, wherein said spread spectrum reflector apparatus is configured for operating in a wireless local data link selected from the group of wireless communication types consisting of Wi-Fi, WLAN, Bluetooth, and Cellular communications.

11. The apparatus as recited in claim 1, wherein said spread spectrum reflector apparatus is configured to be placed at, coupled to, or integrated within a wearable electronic device.

12. A spread spectrum reflector apparatus for reducing unmodulated ambient blockers in reflected data links, the apparatus comprising:
    (a) an antenna input;
    (b) a reflector switch coupled to the antenna input, the reflector switch configured for modulating a termination state of said antenna input so that an input signal is reflected with different amounts of phase change depending on said termination state; and
    (c) a spreading code source having the same spreading code as in the input signal received at the antenna input;
    (d) wherein said reflector switch is continuously modulated with code from said spreading code source;
    (e) wherein said reflector apparatus performs de-spreading of an input signal received at the antenna input to occur at the reflector switch;
    (f) wherein said reflector apparatus reflects a signal that is a de-spread continuous sine wave; and
    (g) wherein a phase shift signal is returned from the reflector switch that is much narrower, as it is an un-spread signal, at the data rate of the reflector.

13. The apparatus as recited in claim 12, wherein the narrower phase shift signal is readily discerned from ambient reflections which are received as a superimposed copy of a much wider input signal.

14. The apparatus as recited in claim 12, wherein said modulating termination state of said antenna input comprises a reflector switch for modulating termination state between an open termination state and a shorted termination state.

15. The apparatus as recited in claim 14, wherein with said reflector switch in a first termination state an input signal received at the antenna input is reflected without a phase change, while with said reflector switch in a second termination state an input signal received at the antenna input is reflected after incurring a 180 degree change in phase.

16. The apparatus as recited in claim 12, wherein the reflected signal has a carrier phase of 0 degrees or 180 degrees that is dependent on the data input signal which selects whether the spreading code or inverse spreading code is used to modulate the reflector switch.

17. The apparatus as recited in claim 12, wherein said reflector switch is continuously modulated with code from said spreading code source in response to a multiplexer having a first code input coupled to said spreading code source and a second code input coupled to said spreading code source through an inverter.

18. The apparatus as recited in claim 17, wherein an output of said multiplexer is coupled to said reflector switch, and has a data input to control selection of whether said reflector switch is modulated with the spreading code or an inverse of the spreading code.

19. The apparatus as recited in claim 12, wherein said apparatus is a component of a communications system comprising a base station having a transmitter and a receiver.

20. The apparatus as recited in claim 19, wherein signals transmitted from the base station are reflected to the receiver by the reflector apparatus to new reflected blocker signals.

21. The apparatus as recited in claim 12, wherein said spread spectrum reflector apparatus is configured for communicating data back to a microwave receiver without requiring a power amplifier to drive an output transmission, as these output transmissions are driven in response to the state of termination of the antenna determining the phase shift and/or extent to which signals from a microwave illuminator are reflected back to be received by the microwave receiver.

22. The apparatus as recited in claim 12, further comprising a receiver and demodulator coupled to said antenna of said spread spectrum microwave reflector for receiving and extracting data transmitted from a microwave illuminator.

23. The apparatus as recited in claim 12, wherein said spread spectrum reflector apparatus is configured for operating in a wireless local data link selected from the group of wireless communication types consisting of Wi-Fi, WLAN, Bluetooth, and Cellular communications.

24. The apparatus as recited in claim 12, wherein said spread spectrum reflector apparatus is configured to be placed at, coupled to, or integrated within a wearable electronic device.

\* \* \* \* \*